(12) United States Patent
Fujimori

(10) Patent No.: US 12,414,178 B2
(45) Date of Patent: Sep. 9, 2025

(54) COMMUNICATION APPARATUS, AND METHOD, FOR SWITCHING BETWEEN FREQUENCIES

(71) Applicant: CANON KABUSHIKI KAISHA, Tokyo (JP)

(72) Inventor: Yuki Fujimori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 406 days.

(21) Appl. No.: 17/932,491

(22) Filed: Sep. 15, 2022

(65) Prior Publication Data

US 2023/0007718 A1 Jan. 5, 2023

Related U.S. Application Data

(63) Continuation of application No. PCT/JP2021/006758, filed on Feb. 24, 2021.

(30) Foreign Application Priority Data

Mar. 18, 2020 (JP) .................................. 2020-048199

(51) Int. Cl.
*H04W 76/15* (2018.01)
*H04W 56/00* (2009.01)
*H04W 84/12* (2009.01)

(52) U.S. Cl.
CPC ......... *H04W 76/15* (2018.02); *H04W 56/001* (2013.01); *H04W 84/12* (2013.01)

(58) Field of Classification Search
CPC ... H04W 76/15; H04W 56/001; H04W 56/00; H04W 84/12; H04W 72/0453; H04W 48/10; Y02D 30/70

(Continued)

(56) References Cited

U.S. PATENT DOCUMENTS

2013/0089039 A1 4/2013 Vashi
2014/0153497 A1 6/2014 Brisebois
(Continued)

FOREIGN PATENT DOCUMENTS

CN 104272784 A 1/2015
CN 104956735 A 9/2015
(Continued)

OTHER PUBLICATIONS

Intel Corp., E-UTRAN FDD-WLAN Event Triggered Reporting in non-DRX under Awgn, 3GPP TSG-RAN WG5 Meeting #75, May 15-19, 2017, China.

(Continued)

*Primary Examiner* — Ricardo H Castaneyra
(74) *Attorney, Agent, or Firm* — Canon U.S.A., Inc., IP Division

(57) ABSTRACT

In a case where a Beacon frame is transmitted through a first frequency channel, and a communication apparatus and one of a multi-link communication non-supporting apparatus and a communication apparatus supporting multi-link communication establish connection through a second frequency channel while a multi-link communication supporting apparatus and the communication apparatus establish connection through a first frequency channel, a frequency channel to transmit the Beacon frame is switched from the first frequency channel to the second frequency channel.

9 Claims, 9 Drawing Sheets

(58) Field of Classification Search
USPC ........ 370/329, 331, 252, 337, 343, 330, 338
See application file for complete search history.

(56) References Cited

U.S. PATENT DOCUMENTS

| | | | |
|---|---|---|---|
| 2017/0171862 A1* | 6/2017 | Matsuo | H04L 5/0092 |
| 2019/0158413 A1* | 5/2019 | Patil | H04W 28/0838 |
| 2020/0154322 A1 | 5/2020 | Liu | |

FOREIGN PATENT DOCUMENTS

| | | |
|---|---|---|
| JP | WO 2016/152683 A1 | 9/2016 |
| WO | 2019/099268 A1 | 5/2019 |

OTHER PUBLICATIONS

Shengshi Weibin, Research on Multichannel Communication Algm of Convergence Tree Protocol, 2017, China.

* cited by examiner

COMMUNICATION APPARATUS, AND METHOD, FOR SWITCHING BETWEEN FREQUENCIES

CROSS-REFERENCE TO RELATED APPLICATIONS

This application is a Continuation of International Patent Application No. PCT/JP2021/006758, filed Feb. 24, 2021, which claims the benefit of Japanese Patent Application No. 2020-048199, filed Mar. 18, 2020, both of which are hereby incorporated by reference herein in their entirety.

BACKGROUND OF THE INVENTION

Field of the Invention

The present invention relates to control of a frequency channel to transmit a Beacon in wireless communication.

Background Art

Standards of a wireless local area network (LAN) technique are formulated by the Institute of Electrical and Electronics Engineers (IEEE)802.11 that is a wireless LAN technique standardization association, and standards of the wireless LAN technique include IEEE80.111/a/b/g/n/ac/ax.

In IEEE 802.11ax discussed in Patent Literature 1, high peak throughput of up to 9.6 Gbps and improvement in communication speed under a congested situation are realized by orthogonal frequency-division multiple access (OFDMA).

To further improve the throughput, the Task Group formulating the standard of IEEE 802.11be as a subsequent standard of IEEE 802.11ax is started.

Conventionally, an access point (AP) of IEEE 802.11 establishes connection with a station (STA) through a single frequency channel, and performs communication. In the IEEE 802.11be standard, a technique enabling one AP to establish connection with an STA through a plurality of frequency channels including a 2.4 GHz band, a 5 GHz band, and a 6 GHz band, and to perform communication is being studied.

In the IEEE 802.11be standard, the technique enabling the AP to establish connection with the STA through the plurality of frequency channels and to perform communication is being studied; however, in a case where the AP transmits a Beacon frame through the plurality of frequency channels, a power consumption and a processing load are increased.

Therefore, transmission of the Beacon frame only through a representative frequency channel is being studied. However, for example, in a case where the AP establishes connection with a second communication apparatus through a second frequency channel while the AP transmits the Beacon frame only through a first frequency channel and communicates with a first communication apparatus, the second communication apparatus cannot receive the Beacon frame. When the second communication apparatus cannot receive the Beacon frame, for example, the second communication apparatus cannot acquire basic information for synchronization, and cannot take synchronization. In addition, in a case where the communication apparatus uses a power saving function, the communication apparatus cannot acquire the above-described basic information, and cannot know a timing when the communication apparatus returns from a power saving state.

CITATION LIST

Patent Literature

PTL 1: Japanese Patent Application Laid-Open No. 2018-50133

SUMMARY OF THE INVENTION

The present invention is directed to prevent occurrence of a communication apparatus that cannot receive the Beacon frame when communication through the plurality of frequency channels is performed.

To achieve the above-described object, a communication apparatus according to the present invention is a communication apparatus that establishes connection with another communication apparatus through a first frequency channel and a second frequency channel, and includes a transmission unit configured to transmit a Beacon frame including first frequency channel information and second frequency channel information, the first frequency channel information being information indicating the first frequency channel, the second frequency channel information being information indicating the second frequency channel, and a switching unit configured to switch, in a case where the transmission unit transmits the Beacon frame through the first frequency channel, and a second other communication apparatus and the communication apparatus establish connection through the second frequency channel while the communication apparatus and a first other communication apparatus that identifies the first frequency channel information and the second frequency channel information, establish connection through the first frequency channel, a frequency channel to transmit the Beacon frame from the first frequency channel to the second frequency channel.

Further features of the present invention will become apparent from the following description of exemplary embodiments with reference to the attached drawings.

DESCRIPTION OF THE EMBODIMENTS

An exemplary embodiment of the present invention is described in detail below with reference to accompanying drawings. A configuration described in the following exemplary embodiment is merely illustrative, and the present invention is not limited to the illustrated configuration.

Figure 1:
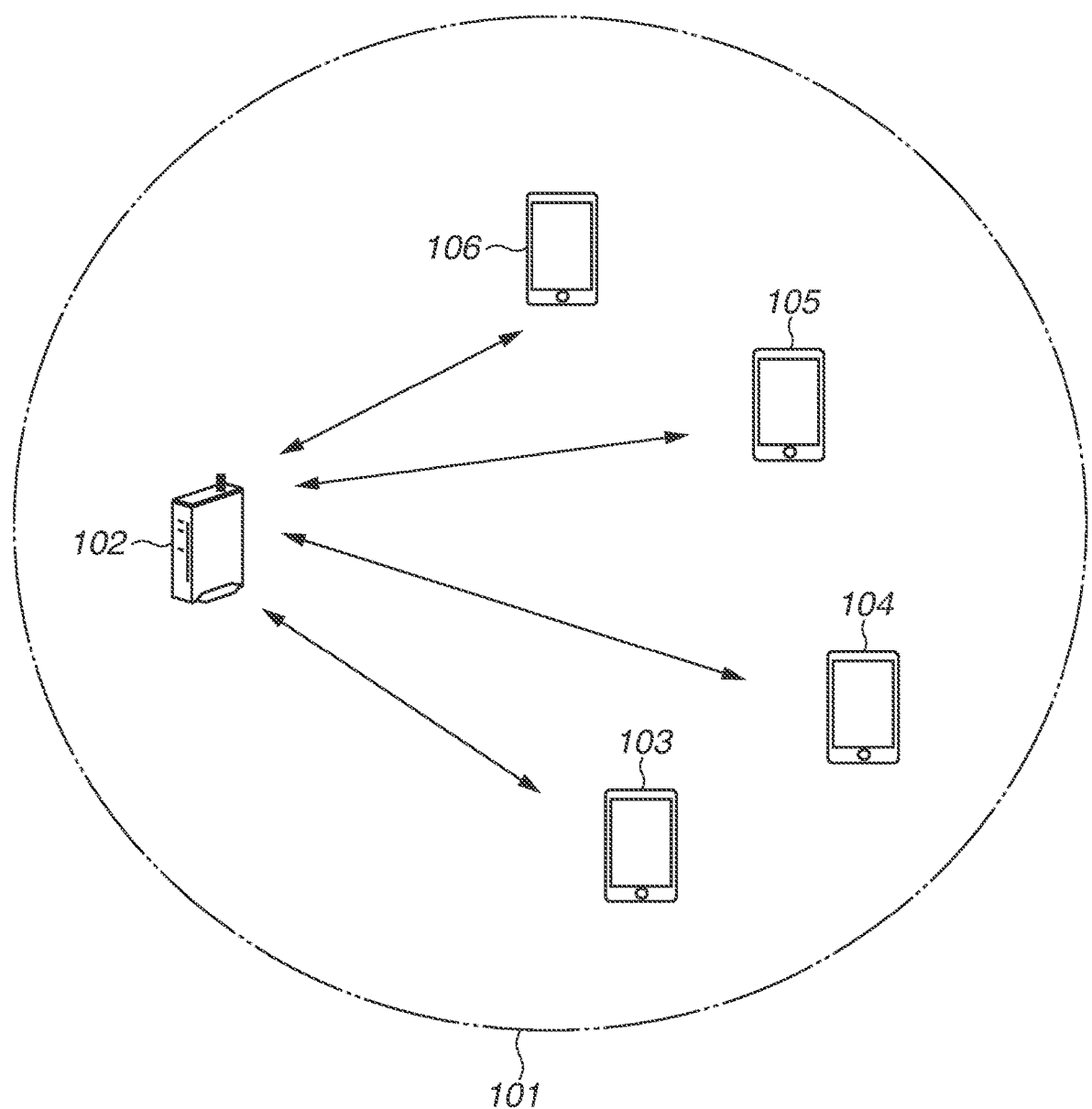
FIG. 1 is a diagram illustrating a configuration of a network to which a communication apparatus 102 belongs.

FIG. 1 illustrates a network configuration constructed by a communication apparatus 102 in the present exemplary embodiment. The communication apparatus 102 is an access point (AP) having a function of constructing a network 101. The network 101 including the communication apparatus 102 and communication apparatuses 103 to 106 is illustrated. The communication apparatus 102 and the communication apparatuses 103 and 106 support the IEEE 802.11be standard, and can perform communication complying with the IEEE 802.11be standard through the network 101.

Further, the communication apparatuses 102, 103, and 106 can establish connection through a plurality of frequency channels in a plurality of frequency bands, and can perform multi-link communication. The plurality of frequency bands indicates a sub-GHz band, a 2.4 GHz band, a 3.6 GHz band, a 4.9 GHz and 5 GHz band, a 60 GHz band, and a 6 GHz band. For example, the communication apparatus 102 can establish, with the communication apparatus 103, connection through a first frequency channel in the 2.4 GHz band and connection through a second frequency channel in the 5 GHz band, and can perform communication through both connections. In this case, the communication apparatus 102 maintains the connection through the second frequency channel in parallel with the connection through the first frequency channel. Further, the established connection may be called link. In addition, the communication apparatus 102 may establish not connections in different frequency bands but a plurality of connections through different frequency channels in the same frequency band.

Further, the communication apparatuses 102, 103, and 106 can perform communication by using band widths of 20 MHz, 40 MHz, 80 MHz, 160 MHz, and 320 MHz.

In contrast, each of the communication apparatuses 104 and 105 does not support the multi-kink communication (hereinafter, referred to as multi-link communication non-supporting apparatus). The multi-link communication non-supporting apparatus may be a communication apparatus supporting IEEE 802.11a/b/g/n/ac/ax standards, or a communication apparatus supporting IEEE 802.11be standard but not supporting the multi-link communication.

In the present exemplary embodiment, each of the communication apparatuses 102, 103, and 106 includes one or more wireless local area network (LAN) control units. In a case where each of the communication apparatuses 102, 103, and 106 includes two or more wireless LAN communication units, each of the communication apparatuses 102, 103, and 106 can simultaneously transmit/receive frames by using a plurality of frequency channels. The diagram is illustrative, and the following discussions are applicable to, for example, a network including a large number of communication apparatuses in a wider area or a positional relationship of various communication apparatuses without limitation.

Figure 2:
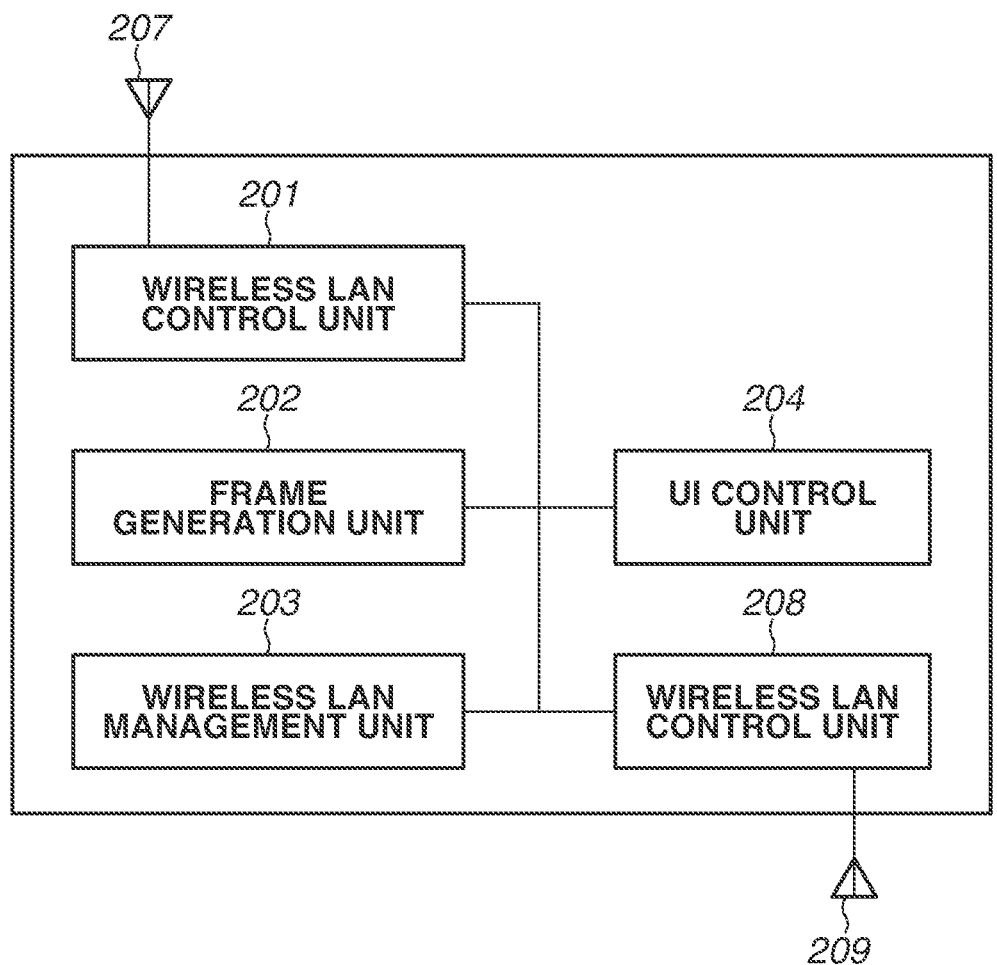
FIG. 2 is a diagram illustrating a functional configuration of each of communication apparatuses 102 to 106.

FIG. 2 illustrates a functional configuration of each of the communication apparatuses 102 to 106 according to the present exemplary embodiment. Each of the communication apparatuses 102 to 106 includes wireless LAN control units 201 and 208, a frame generation unit 202, a wireless LAN management unit 203, and a user interface (UI) control unit 204, and wireless antennae 207 and 209.

The wireless LAN control units 201 and 208 are each configured to include a circuit to transmit/receive wireless signals to/from another communication apparatus, and programs to control the circuit. The wireless LAN control units 201 and 208 each control wireless communication based on a frame generated by the frame generation unit 202 described below according to the IEEE 802.11 series standards. The wireless LAN control units 201 and 208 each control a wireless signal with another communication apparatus in the 2.4 GHz band, the 5 GHz band, and the 6 GHz band.

The number of wireless LAN control units is not limited to two, and may be one or three or more without limitation. In a case where one wireless LAN control unit is provided, the wireless LAN control unit may be used in a time-divisional manner so as to transmit/receive frames of the plurality of frequency channels. The number of provided wireless antennae is coincident with the number of wireless LAN control units.

The frame generation unit 202 generates a wireless LAN control frame to be transmitted by at least one of the wireless LAN control units 201 and 208. The wireless LAN control frame generated by the frame generation unit may be generated based on a setting stored in a storage unit 301 described below. Further, in addition thereto or in place thereof, the wireless LAN control frame may be generated based on a user setting input by a user.

The wireless LAN management unit 203 manages frequency channels supported by the communication apparatuses 102 to 106. For example, in a case where the wireless LAN control unit 201 supports the 2.4 GHz band, and the wireless LAN control unit 208 supports the 6 GHz band, the wireless LAN management unit 203 manages and shares these frequency channels with the frame generation unit 202.

In the communication apparatus 102, the wireless LAN management unit 203 manages a connection state of a communication apparatus that currently establishes connection. The connection state includes information about the number of connected communication apparatuses through which frequency channels, and information on whether the communication apparatus establishing connection is the multi-link communication non-supporting apparatus. The frequency channel supported by each of the wireless LAN control units may be determined by a communication unit 306 and wireless antennae 307 and 308 described below, and may be restricted by a setting stored in the storage unit 301. Alternatively, the frequency channel supported by each of the wireless LAN control units may be changed by a user setting through the UI control unit 204.

The UI control unit 204 is configured to include a touch panel to receive an operation to the communication apparatus by the user or hardware relating to UI such as buttons, and programs controlling the touch panel and the hardware. The UI control unit 204 has a function of presenting information to the user, for example, a function of displaying an image or outputting sound.

Figure 3:
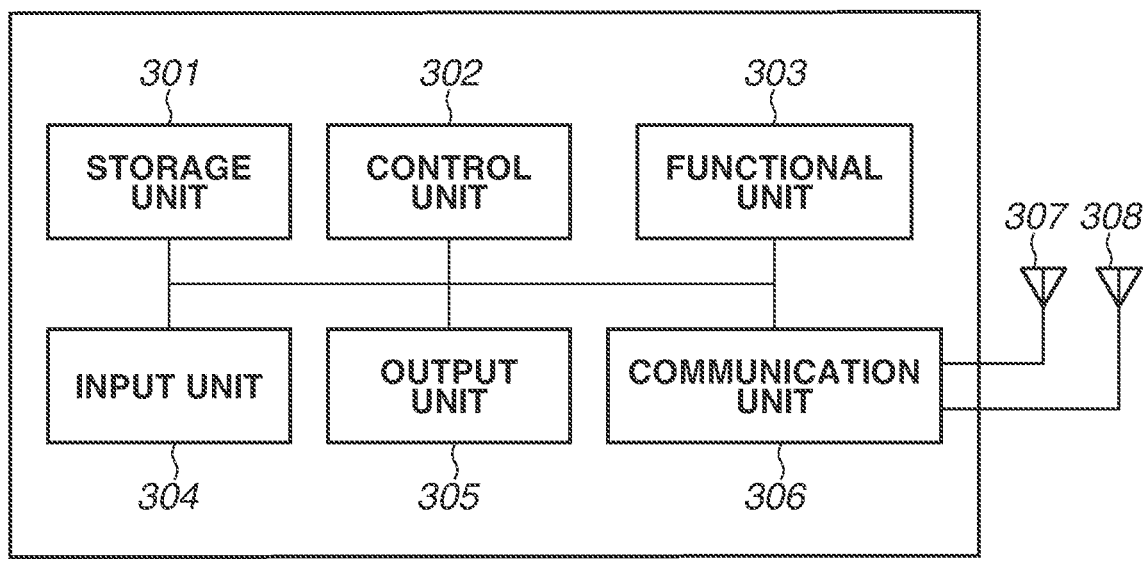
FIG. 3 is a diagram illustrating a hardware configuration of each of the communication apparatuses 102 to 106.

FIG. 3 illustrates a hardware configuration of each of the communication apparatuses 102 to 106 according to the present exemplary embodiment. The communication apparatus 102 includes the storage unit 301, a control unit 302, a functional unit 303, an input unit 304, an output unit 305, the communication unit 306, and the wireless antennae 307 and 308.

The storage unit 301 includes one or more memories such as a read only memory (ROM) and a random access memory (RAM), and stores programs to perform various kinds of operations described below, and various kinds of information such as communication parameters for wireless communication. As the storage unit 301, in addition to the memories such as the ROM and the RAM, storage media such as a flexible disk, a hard disk, an optical disk, a magnetooptical disk, a compact disc-read only memory (CD-ROM), a compact disc recordable (CD-R), a magnetic tape, a nonvolatile memory card, and a digital versatile disc (DVD) may be used. Further, the storage unit may include a plurality of memories and the like.

The control unit 302 includes processors such as a central processing unit (CPU) and a micro processing unit (MPU), an application specific integrated circuit (ASIC), a digital signal processor (DSP), a field programmable gate array (FPGA), and the like.

The control unit 302 controls the whole of the AP or the STA by executing the programs stored in the storage unit 301. The control unit 302 may control the whole of the AP or the STA in cooperation with the programs stored in the storage unit 301 and an operating system (OS).

Further, the control unit 302 controls the functional unit 303 to perform predetermined processing such as imaging, printing, and projection. The functional unit 303 is hardware to cause the AP or the STA to perform the predetermined processing. For example, in a case where the AP or the STA is a camera, the functional unit 303 is an imaging unit, and preforms imaging processing. In a case where the AP or the STA is a printer, the functional unit 303 is a printing unit, and performs printing processing. Further, for example, in a case where the AP or the STA is a projector, the functional unit 303 is a projection unit, and performs projection processing. Data processed by the functional unit 303 may be data stored in the storage unit 301, or data communicated with another AP or STA through the communication unit 306 described below.

The input unit 304 receives various kinds of operations from the user. The output unit 305 performs various kinds of outputs to the user through a monitor screen and a speaker. The output by the output unit 305 may be display on the monitor screen, sound output by the speaker, vibration output, or the like. Both of the input unit 304 and the output unit 305 may be realized by one module like a touch panel. Further, the input unit 304 and the output unit 305 may be each integrated with or separated from the communication apparatus 102.

The communication unit 306 controls wireless communication complying with the IEEE 802.11 series standards. The communication unit 306 controls the antennae 307 and 308 to transmit/receive signals for wireless communication generated by the control unit 302. In a case where the communication apparatus 102 supports a near field communication (NFC) standard, a Bluetooth® standard, or other standards in addition to the IEEE 802.11be standard, the communication unit 306 may control wireless communication complying with these communication standards. In a case where the communication apparatus 102 can perform wireless communication complying with a plurality of communication standards, the communication unit and the antenna corresponding to each of the communication standards may be individually provided. The communication apparatus 102 communicates data such as image data, document data, and video data with each of the communication apparatuses 103, 104, 105, and 106 through the communication unit 306. At least one of the antennae 307 and 308 may be integrated with or separated from the communication unit 306. Further, each of the antennae 307 and 308 may include one or more physical antennae to perform multi-input and multi-output (MIMO) transmission/reception.

Each of the communication apparatuses 102 to 106 operates the units by using power supplied through an external power supply or a built-in battery.

Figure 4:
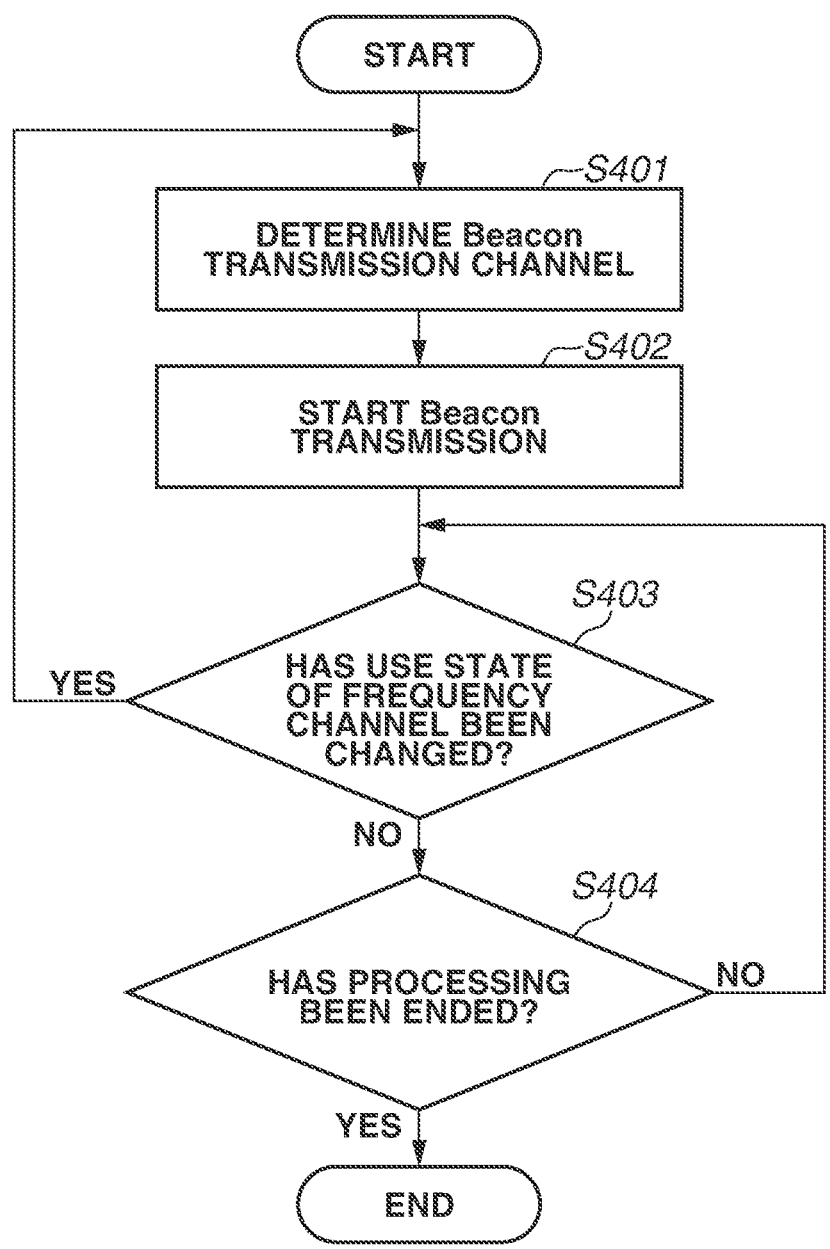
FIG. 4 is a flowchart relating to processing to transmit a Beacon frame by the communication apparatus 102.

FIG. 4 is a flowchart illustrating a flow of processing performed when the control unit 302 executes the programs stored in the storage unit 301 of the communication apparatus 102. The flowchart illustrates a flow of processing to transmit a Beacon frame.

In the present exemplary embodiment, the flowchart is started when the wireless LAN function is started, for example, when the communication apparatus 102 is turned on or when the wireless LAN function of the communication apparatus 102 is turned on.

First, in step S401, the communication apparatus 102 determines the frequency channel to transmit the Beacon frame, in Beacon frame transmission channel determination processing.

The frequency channel to transmit the Beacon frame is determined based on information on the frequency channel supported by the AP, managed by the wireless LAN management unit 203 of the communication apparatus 102. For example, in a case where the wireless LAN control unit 201 supports the 2.4 GHz band, and the wireless LAN control unit 208 supports the 5 GHz band, the communication apparatus 102 can use one frequency channel in the 2.4 GHz band and one frequency channel in the 5 GHz band. In addition, the communication apparatus 102 can also use two frequency channels in the 2.4 GHz band and two frequency channels in the 5 GHz band.

Further, the communication apparatus 102 can determine the frequency channel to transmit the Beacon frame, based on the connection state of the communication apparatus that establishes connection with the communication apparatus 102, managed by the wireless LAN management unit 203. This is described below with reference to FIG. 5.

After determining the frequency channel to transmit the Beacon frame, the communication apparatus 102 starts processing to transmit the Beacon frame through the determined frequency channel at a period of Beacon frame Interval in step S402. The Beacon frame Interval is set to 100 milliseconds in this example; however, the Beacon frame Interval is not limited thereto.

In step S403, the communication apparatus 102 monitors a use state of the frequency channel. In a case where the use state of the frequency channel has been changed (YES in step S403), the processing returns to step S401. In a case where the use state of the frequency channel has not been changed (NO in step S403), the processing in step S403 is repeatedly performed until it is determined to end the processing in step S404. During the period, transmission of the Beacon frame is maintained in the frequency channel at which the transmission has been started in step S402.

In a case where the connection state between the communication apparatus 102 and another communication apparatus is changed, the use state of the frequency channel may be changed. In the present exemplary embodiment, connection of a new communication apparatus is described as an example of change in the use state of the frequency channel; however, disconnection of the connection with the other communication apparatus that has been already established, may be handled as change in the use state of the frequency channel.

Further, when the usable frequency channel is changed by user input, or when the communication apparatus 102 detects that congested situations of the surrounding wireless channels are changed, the use state of the frequency channel may be changed. Therefore, the processing may return to step S401 with the change as a trigger.

In step S404, when the wireless LAN function ends, for example, when the communication apparatus 102 is turned off or when the wireless LAN function of the communication apparatus 102 is turned off, the processing ends.

When the Beacon frame is transmitted through all of the plurality of connected frequency channels in the multi-link communication, a power consumption and a processing load are increased. In other words, the power to be supplied to the communication unit 306 is increased, and the processing to be performed in parallel by the control unit 302 is increased. Therefore, a representative channel is selected from the plurality of frequency channels, and the Beacon frame including not only information on the representative channel but also information on the other frequency channels (non-representative channels) is transmitted through the representative channel. The representative channel may be referred to as a Primary CH. As a result, each of the communication apparatuses establishing the connection with the communication apparatus 102 can acquire information on the non-representative channels together, from the Beacon frame of the representative channel. The acquired information includes timing synchronization function (TSF) information for synchronization with the communication apparatus, and traffic indication map (TIM) information indicating whether transmission data to each of the communication apparatuses stands by; however, the information is not limited thereto.

The information on the frequency channels included in the Beacon frame may include only information on frequency channels other than the frequency channel through which the Beacon frame is being transmitted. For example, the Beacon frame transmitted in the 2.4 GHz band may include only information on the frequency channel in the 5 GHz band, and the Beacon frame transmitted in the 5 GHz band may include only information on the frequency channel in the 2.4 GHz band. In a case where a plurality of channels is usable in the same 5 GHz band, the Beacon frame may include information on frequency channels in the same frequency band in order to notify the availability of different channels in the same frequency band.

The information on the frequency channel may be imparted not only to the Beacon frame but also to a Probe Response, an Association Response, or a Reassociation Response transmitted by the communication apparatus 102. Further, each of the communication apparatuses 103 and 106 that are multi-link communication supporting apparatuses may notify the own usable frequency information to the communication apparatus 102 through a Probe Request, an Association Request, or a Reassociation Request.

The frequency channel information can be imparted to the Beacon frame by being stored in a multi-link communication supporting information element such as a Multi-Link Capability Element. Further, the frequency channel information may be stored by extending an existing information element such as a Multi-Band Element, and a similar method can be used without limitation.

Figure 9:
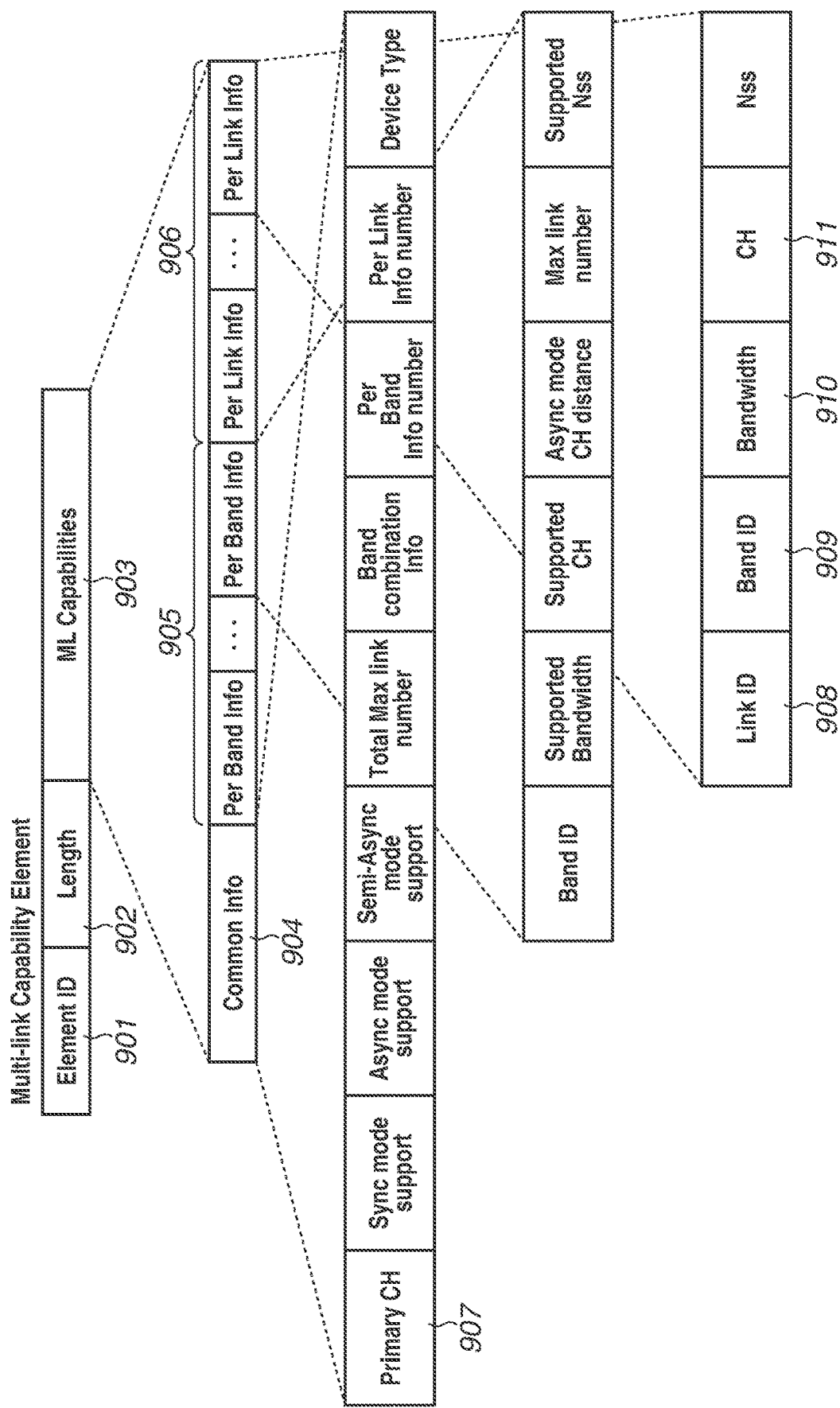
FIG. 9 is a diagram illustrating an example of a frame format of a Multi-Link Capability Element.

FIG. 9 illustrates an example of a frame format of the Multi-Link Capability Element. In the present exemplary embodiment, a name of the Element illustrated in FIG. 9 is Multi-Link Capability Element; however, the name is not limited thereto, and may be, for example, Multi-Link Element or other names.

Each of the communication apparatuses 102, 103, and 106 can notify a partner apparatus of capability information indicating capability of the own apparatus in the multi-link communication, by using the Multi-Link Capability Element illustrated in FIG. 9. The communication apparatus 102 detects that the communication apparatus is the multi-link communication supporting apparatus, from the received capability information.

The frame of the Multi-Link Capability Element includes an Element ID 901, a Length 902, and an ML Capabilities 903. The ML Capabilities 903 includes Common Info 904, Per Band Info 905, and Per Link Info 906. The Common Info 904 is a field indicating information common to all of the frequency bands and links. Further, the Per Band Info 905 is a field indicating information common to all of the links included in a specific frequency band, and includes information for each frequency band. Further, the Per Link Info 906 is a field indicating information for each link, and includes information for each link.

A Primary CH 907 included in the Common Info 904 is a field including information indicating a frequency channel to transmit/receive a management frame relating to the multi-link communication. The management frame indicates the Beacon frame, the Probe Request frame/Response frame, the Association Request frame/Response frame, and an Action frame.

In a case where the capability information is indicated by the Element, the Per Link Info 906 indicates information about a frequency channel through which multi-link communication is supported by the transmission apparatus of the Element. In this case, a set of Per Link Info 906 is included by the number of channels through which the multi-link communication is supported by the transmission apparatus of the Element. In the present exemplary embodiment, for example, in a case where the communication apparatus 102 supports 1 CH in the 2.4 GHz band and 3 CH in the 5 GHz band, the Per Link Info 906 includes two fields that are a field for 1 CH in the 2.4 GHz band and a field for 3 CH in the 5 GHz band. Further, the frequency channel information included in the Beacon frame is information included in the Per Link Info 906, and is information for communication through the frequency channel indicated by the frequency channel information included in the Beacon frame. The multi-link communication supporting apparatus can identify the information included in the Per Link Info 906, but the multi-link communication non-supporting apparatus cannot identify the information included in the Per Link Info 906.

A Link ID 908 included in the Per Link Info 906 is a field including an identifier for identification of the link.

A Band ID 909 included in the Per Link Info 906 is a field including information for identification of a frequency band. For example, it is assumed that the Band ID 909 includes values of 0, 1, and 2, and the 2.4 GHz band, the 5 GHz band, and the 6 GHz band as the frequency bands corresponding to the values. At this time, for example, when the Band ID 909 has the value of 0, the Per Link Info 906 including the Band ID 909 is information common to a Link of the multi-link communication in the 2.4 GHz band. The correspondence relationship between the value included in the Band ID 909 and contents indicated by the value is not limited thereto. Further, the number of bits of the Band ID 909 may be increased to indicate more frequency bands.

A Bandwidth 910 is a field including information indicating a bandwidth in the link indicated by the Link ID 908.

In a case where the capability information is indicated by the Multi-Link Capability Element, this field indicates a bandwidth supported by the link indicated by the Link ID 908. The Bandwidth 910 is a field including capability information indicating a bandwidth supported by the communication apparatus in the frequency band indicated by the Band ID 909. For example, it is assumed that the Bandwidth 910 includes values of 0, 1, and 2, and a 20 MHz width, a 40 MHz width, and an 80 MHz width as the frequency bandwidths corresponding to the values. At this time, for example, when the Band ID 909 has the value of 0, the bandwidth supported by the transmission apparatus of the Multi-Link Capability Element in the frequency band indicated by the Band ID 909 is 20 MHz. In a case where the Bandwidth 910 has the value of 1 or more, the transmission apparatus of the Multi-Link Capability Element can support all of the bandwidth of the value or less when establishing link of the multi-link communication. For example, when the Bandwidth 910 has the value of 2, the transmission apparatus supports all of 20 MHz, 40 MHz, and 80 MHz as the bandwidths of the link. In each of the communication apparatuses 102 and 103, the supporting bandwidth in the communication only by one link and the supporting bandwidth in the multi-link communication may be different from each other.

A CH 911 is a field including information indicating the frequency channel of the link indicated by the Link ID 908. This field may include the number indicating the channel as it is. Alternatively, the CH 911 may include values of 0, 1, and 2, and the channels of, for example, 1 CH, 2 CH, and 3 CH may be displayed as the channels corresponding to the values. For example, when the CH 911 has the value of 0, the corresponding channel is 1 CH. The correspondence relationship between the value included in the CH 911 and the contents indicated by the value is not limited thereto.

A flow of processing when, in step S401, the control unit 302 determines the frequency channel to transmit the Beacon frame by executing the programs stored in the storage unit 301 of the communication apparatus 102 is described with reference to FIG. 5.

First, in step S501, the communication apparatus 102 determines the presence/absence of a communication apparatus that has established connection with the communication apparatus 102. The connection state of the communication apparatus is managed by the wireless LAN management unit 203. In a case where it is determined in step S501 that the communication apparatus having established connection is absent (NO in step S501), the frequency channel to transmit the Beacon frame is determined in step S502. In this case, the frequency channel can be determined based on a default setting of the communication apparatus 102, a setting by user input, or a setting corresponding to a surrounding wireless environment. After the frequency channel to transmit the Beacon frame is determined in step S502, the processing ends.

Further, in step S502, the communication apparatus 102 may change the frequency channel to transmit the Beacon frame to only the plurality of frequency channels set by the user, or may determine the channel used for each link, based on the user setting. In a case where user input is absent, the default setting held in the storage unit 301 is used.

Further, the frequency channel to transmit the Beacon frame may be determined based on a congested situation of the surrounding wireless environment. As a method of investigating the congested situation, a method of transmitting the Probe Request in the frequency band and counting the number of responded Probe Response, or a method of counting the number of Beacon frames received during a predetermined period is considered. In addition, a method of totalizing the number of times of carrier sensing during a predetermined period, or a method of exchanging information with another communication apparatus is considered; however, the method is not limited thereto.

In a case where it is determined in step S501 that the communication apparatus having established connection is present (YES in step S501), it is determined in step S503 whether only one communication apparatus has established the connection. The number of connected communication apparatuses is also managed by the wireless LAN management unit 203.

In a case where it is determined in step S503 that only one communication apparatus has established connection (YES in step S503), it is determined in step S504 whether the connection is through the frequency channel through which the Beacon frame is being transmitted. In a case where it is determined in step S504 that the connection is through the frequency channel through which the Beacon frame is being transmitted (YES in step S504), the frequency channel to transmit the Beacon frame is maintained in step S505. The processing then ends. In a case where it is determined in step S504 that the connection is not through the frequency channel through which the Beacon frame is being transmitted (NO in step S504), the frequency channel to transmit the Beacon frame is switched to the frequency channel through which the communication apparatus has established connection, in step S506. The processing then ends. The case where the connection is not through the frequency channel through which the Beacon frame is being transmitted indicates, for example, a case where the communication apparatus 103 has established connection in the 2.4 GHz band while the communication apparatus 102 transmits the Beacon frame in the 5 GHz band. In this case, the frequency channel to transmit the Beacon frame is determined to the 2.4 GHz band. When, in step S506, the frequency channel to transmit the Beacon frame is switched to the frequency channel through which the communication apparatus 103 has established connection, transmission of the Beacon frame through the frequency channel through which the Beacon frame is being transmitted may be maintained. In this case, the Beacon frame is transmitted through the two frequency channels.

In a case where it is determined in step S503 that two or more communication apparatuses have established connection (NO in step S503), it is determined in step S507 whether the connection is through the frequency channel through which the Beacon frame is being transmitted. In a case where it is determined in step S507 that the connection is through the frequency channel through which the Beacon frame is being transmitted (YES in step S507), the frequency channel to transmit the Beacon frame is maintained in step S508. The processing then ends. In a case where it is determined in step S507 that the connection is not through the frequency channel through which the Beacon frame is being transmitted (NO in step S507), it is determined in step S509 whether the multi-link communication non-supporting apparatus has established connection through the frequency channel through which the Beacon frame is being transmitted. Note that whether the communication apparatus that has established connection is the multi-link communication non-supporting apparatus is also managed by the wireless LAN management unit 203. In a case where it is determined in step S509 that the multi-link communication non-supporting apparatus has established connection (YES in step S509), the frequency channel to transmit the Beacon frame is switched to both frequency channels in step S510. The processing then ends. For example, a case where the communication apparatus 102 has established connection with the multi-link communication non-supporting apparatus in the 2.4 GHz band while transmitting the Beacon frame in the 2.4 GHz band is described. At this time, in a case where the multi-link communication non-supporting apparatus has established connection also in the 5 GHz band, the Beacon frame is transmitted through both of the frequency channels. In a case where the communication apparatus 102 has established connection with an apparatus supporting the multi-link communication in the 5 GHz band, the Beacon frame is similarly transmitted.

In a case where it is determined in step S509 that the multi-link communication non-supporting apparatus has not established connection (NO in step S509), the frequency channel is switched to the frequency channel through which the second or subsequent communication apparatus has established connection, in step S511. The processing then ends. For example, a case where the communication apparatus 102 has established connection with an apparatus supporting the multi-link communication in the 2.4 GHz band while transmitting the Beacon frame in the 2.4 GHz band is described. At this time, in a case where the multi-link communication non-supporting apparatus has established connection in the 5 GHz band, the frequency channel to transmit the Beacon frame is switched from the 2.4 GHz band to the 5 GHz band. In a case where the communication apparatus that has established connection in the 5 GHz band is an apparatus supporting the multi-link communication, the frequency channel is similarly switched.

As described above, in the case where the Beacon frame is transmitted through one of the frequency channels, it is possible to perform communication so as not to generate a communication apparatus that cannot receive the Beacon frame while reducing the power consumption of the communication apparatus. In other words, it is sufficient to supply, to the communication unit 306, power necessary for transmission of the Beacon frame through one of the frequency channels. This makes it possible to reduce the power consumption as compared with the case where the Beacon frame is transmitted through the plurality of frequency channels. Further, it is unnecessary for the control unit 302 to perform processing to transmit the Beacon frame through the plurality of frequency channels in parallel. Therefore, the processing load of the control unit 302 is reduced. Further, the multi-link communication non-supporting apparatus can receive the Beacon frame under the situation. Therefore, such an apparatus can appropriately perform the communication based on the Beacon frame, and can perform the processing based on the Beacon frame.

Figure 5:
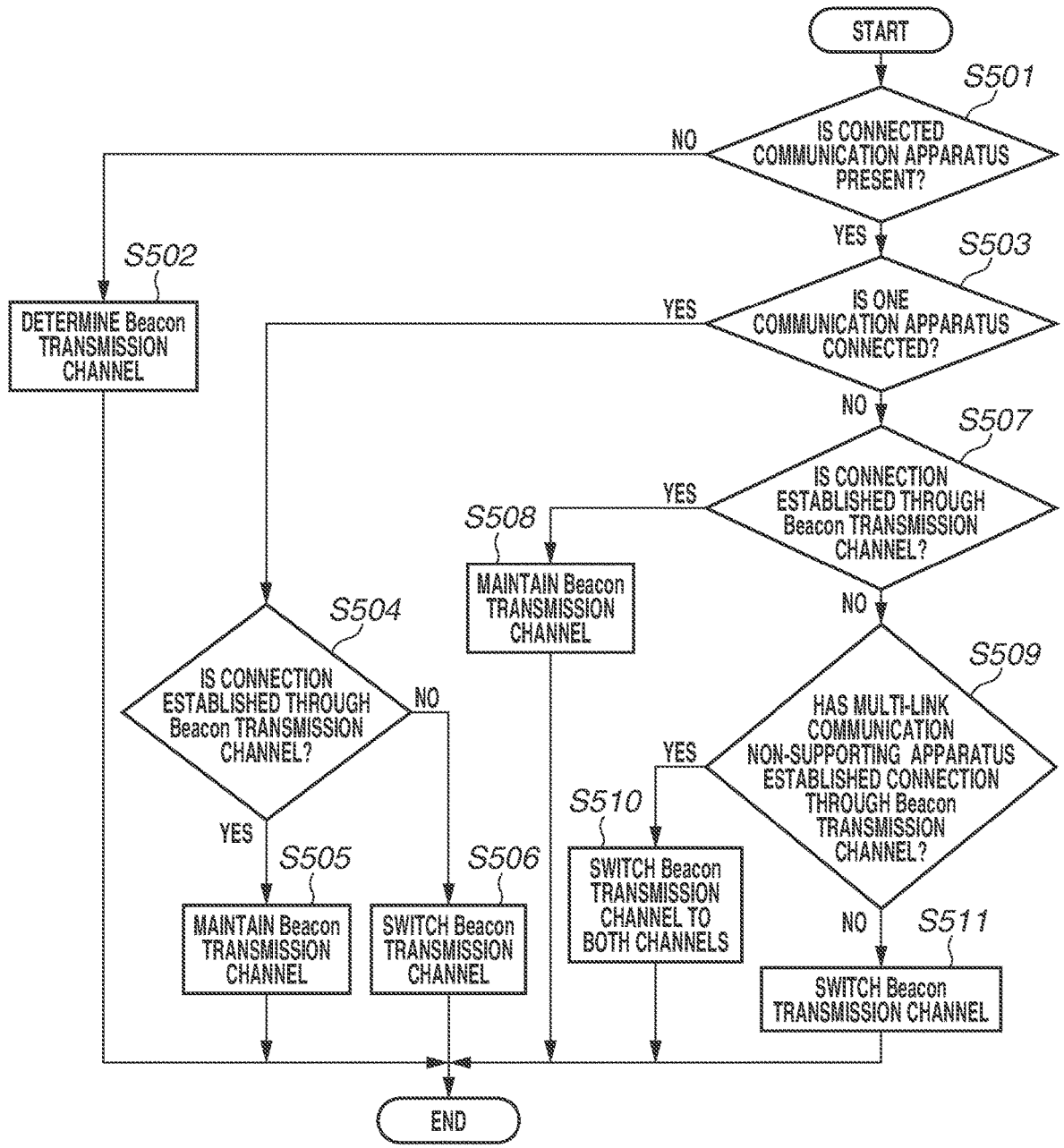
FIG. 5 is a flowchart for determination of a frequency channel to transmit a Beacon frame.

Specific examples of the processing of the flowchart in FIG. 5 are described with reference to FIG. 6 to FIG. 8.

Figure 6:
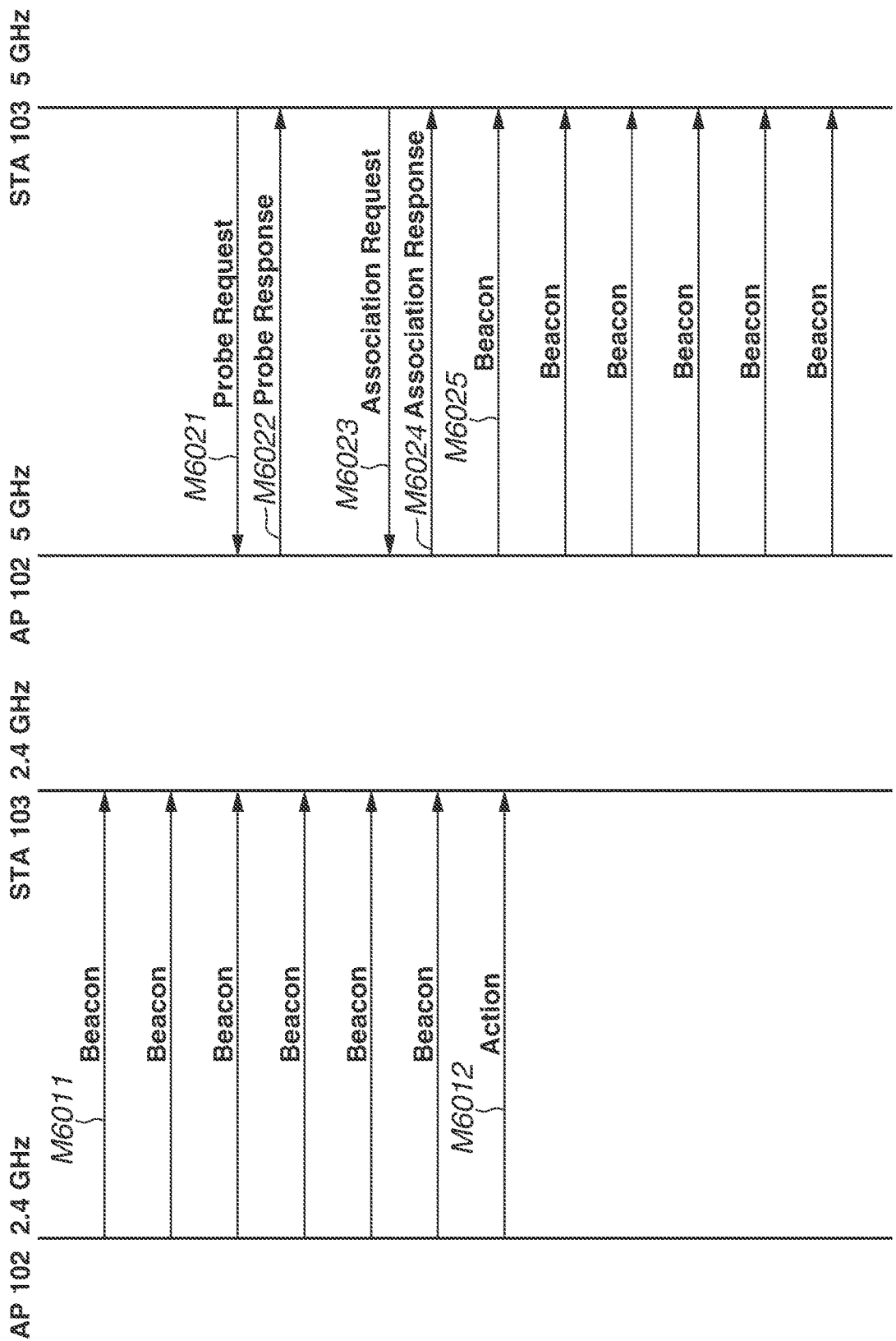
FIG. 6 is a sequence diagram in a case where, after the communication apparatus 102 determines the frequency channel to transmit the Beacon frame, the communication apparatus 103 supporting multi-link communication establishes connection.

FIG. 6 is a sequence diagram in a case where, after the communication apparatus 102 determines the frequency channel in the 2.4 GHz band as the frequency channel to transmit the Beacon frame, the communication apparatus 103 supporting the multi-link communication establishes connection in the 5 GHz band.

In step S502 after startup, the communication apparatus 102 determines the 2.4 GHz band as the frequency channel to transmit the Beacon frame, and in step S402, the communication apparatus 102 starts transmission of the Beacon frame (M6011). As a result, the communication apparatus 103 starts reception of the Beacon frame in the 2.4 GHz band. The Beacon frame includes not only the frequency channel information on the 2.4 GHz band but also the frequency channel information on the 5 GHz band. Therefore, the communication apparatus 103 can identify that the communication apparatus 102 can perform communication through the frequency channels in the 2.4 GHz band and the 5 GHz band. In other words, the communication apparatus 103 detects that the communication apparatus 102 can perform communication through the frequency channel in the 5 GHz band by receiving the Beacon frame in the 2.4 GHz band. When the communication apparatus 103 transmits the Probe Request frame by broadcast in the 5 GHz band (M6021), the communication apparatus 102 can receive the Probe Request frame through the frequency channel in the 5 GHz band. The communication apparatus 102 transmits the Probe Response frame in response to the received Probe Request frame (M6022). As a result, the communication apparatus 103 detects that the communication apparatus 102 can perform communication through the frequency channel in the 5 GHz band. At this time, in a case where the communicable frequency channel information is sufficiently received through reception of the Beacon frame, the Probe Request frame and the Probe Response frame can be omitted.

To establish connection with the communication apparatus 102 in the 5 GHz band, the communication apparatus 103 transmits the Association Request frame (M6023). The communication apparatus 102 transmits the Association Response frame in response to the received Association Request frame (M6024). As a result, the communication apparatus 103 and the communication apparatus 102 establish connection through the frequency channel in the 5 GHz band.

With the connection as a trigger, the communication apparatus 102 determines in step S403 that the use state of the frequency channel has been changed. The processing then returns to step S401. Although the communication apparatus 102 transmits the Beacon frame through the frequency channel in the 2.4 GHz, the communication apparatus 102 detects that the communication apparatus has been connected in the 5 GHz band, and switches the frequency channel to transmit the Beacon frame, to the frequency channel of the 5 GHz band in step S506.

Because of the switching, it is sufficient for the communication apparatus 103 to monitor the Beacon frame only through the frequency channel in the 5 GHz band. Accordingly, the communication apparatus 103 can maintain the communication with a low power consumption and a low processing load as compared with a case where the communication apparatus 103 performs communication through the frequency channel in the 5 GHz band while receiving the Beacon frame through the frequency channel in the 2.4 GHz band. Further, the communication apparatus 102 can also maintain the communication with a low power consumption and a low processing load as compared with the case where the communication apparatus 102 transmits the Beacon frame through the frequency channels in the 2.4 GHz band and the 5 GHz band.

The communication apparatus 102 may transmit the Action frame (M6012) through the frequency channel through which the Beacon frame is being transmitted, in order to notify switching of the frequency channel to transmit the Beacon frame. Further, the communication apparatus 102 sets the frequency channel to transmit the Beacon frame to the 2.4 GHz band when transmitting M6022; however, the communication apparatus 102 may switch the frequency channel to the 5 GHz band and notify the communication apparatus 103 of the switching of the frequency channel when transmitting M6024. In this case, at the time when M6023 is received, the communication apparatus 102 detects change of the use state of the frequency channel in step S403, the processing returns to step S401, and the communication apparatus 102 changes the frequency channel to transmit the Beacon frame to the 5 GHz band. The frequency channel information in the M6024 frame can be updated from the 2.4 GHz band to the 5 GHz band.

The communication apparatus 102 that has switched the frequency channel to transmit the Beacon frame maintains transmission of the Beacon frame through the switched frequency channel (M6025).

In the present exemplary embodiment, the communication apparatus 103 is the communication apparatus supporting the multi-link communication. When connection with the communication apparatus 104 that is the multi-link communication non-supporting apparatus is established, similar processing can be performed.

Figure 7:
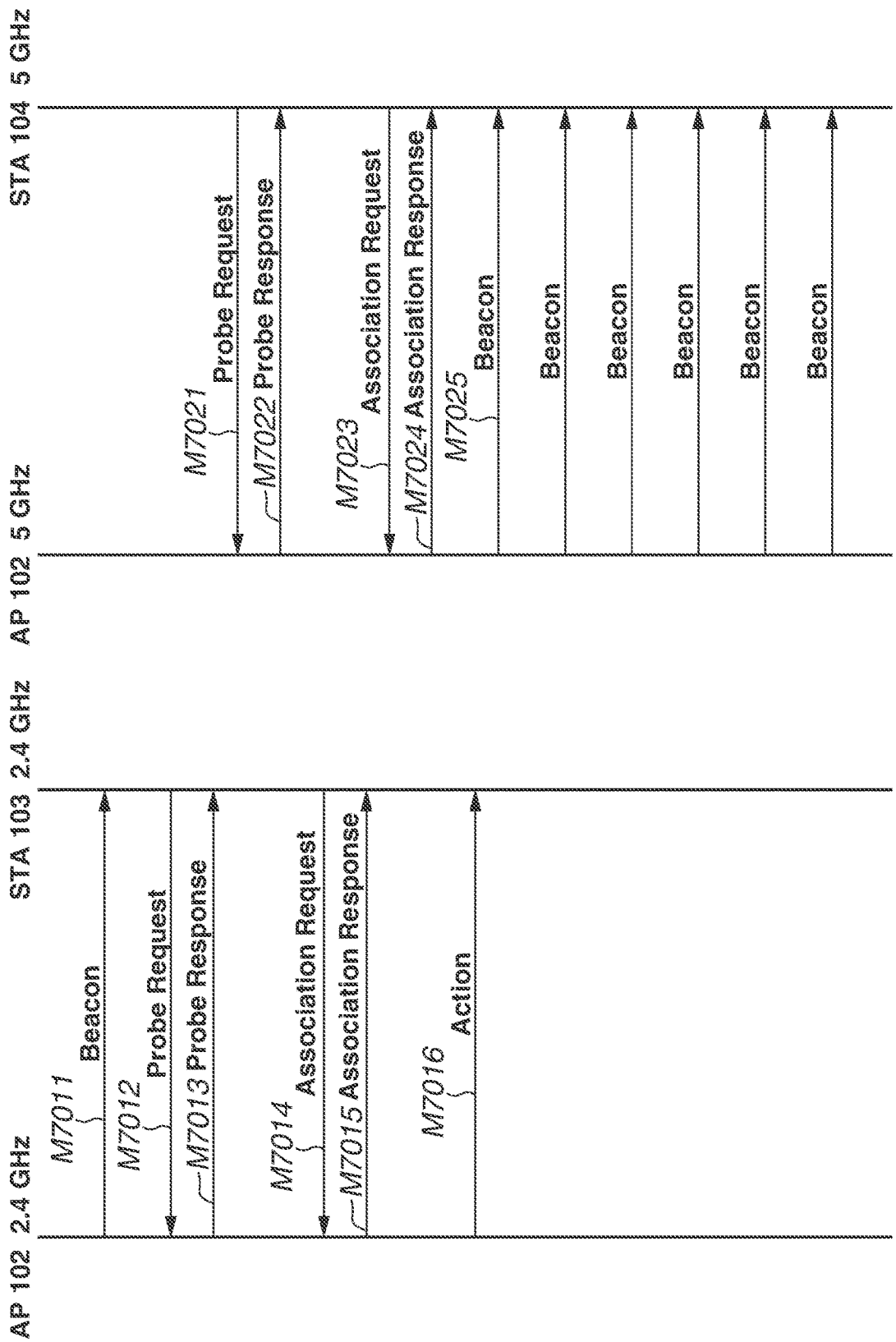
FIG. 7 is a sequence diagram in a case where the communication apparatus 103 supporting the multi-link communication establishes connection, and then the communication apparatus 104 that is a multi-link communication non-supporting apparatus establishes connection.

FIG. 7 is a sequence diagram in a case where the communication apparatus 102 and the communication apparatus 103 supporting the multi-link communication establish connection, and then the communication apparatus 102 and the communication apparatus 104 that is the multi-link communication non-supporting apparatus establish connection. As an example, a case where, after the communication apparatus 102 determines the frequency channel in the 2.4 GHz band as the frequency channel to transmit the Beacon frame, the communication apparatus 103 establishes connection in the 2.4 GHz band, and then the communication apparatus 104 establishes connection in the 5 GHz band, is described.

In step S502 after startup, the communication apparatus 102 determines the 2.4 GHz band as the frequency channel to transmit the Beacon frame, and in step S402, the communication apparatus 102 starts transmission of the Beacon frame (M7011). The communication apparatus 103 starts reception of the Beacon frame through the frequency channel in the 2.4 GHz band. Since the Beacon frame includes the frequency channel information on the 5 GHz band, the communication apparatus 103 can identify that the communication apparatus 102 can perform communication through the frequency channels in the 2.4 GHz band and the 5 GHz band. In other words, the communication apparatus 103 detects that the communication apparatus 102 can perform communication through the frequency channel in the 5 GHz band by receiving the Beacon frame in the 2.4 GHz band. When the communication apparatus 103 transmits the Probe Request frame by broadcast in the 2.4 GHz band (M7012), the communication apparatus 102 can receive the Probe Request Frame through the frequency channel in the 2.4 GHz band. The communication apparatus 102 transmits the Probe Response frame in response to the received Probe Request frame (M7013). As a result, the communication apparatus 103 detects that the communication apparatus 102 can perform communication through the frequency channel in the 5 GHz band, by receiving the Beacon frame of the communication apparatus 102 in the 2.4 GHz band.

To establish connection with the communication apparatus 102 in the 2.4 GHz band, the communication apparatus 103 transmits the Association Request frame (M7014). The communication apparatus 102 transmits the Association Response frame in response to the received Association Request frame (M7015). As a result, the communication apparatus 103 and the communication apparatus 102 establish connection through the frequency channel in the 2.4 GHz band.

With the connection as a trigger, the communication apparatus 102 determines in step S403 that the use state of the frequency channel has been changed. The processing then returns to step S401. Although the communication apparatus 102 detects that the communication apparatus has established connection in the 2.4 GHz band, the communication apparatus 102 determines in step S505 that the Beacon frame is continuously transmittable through the frequency channel in the 2.4 GHz band, and maintains the frequency channel to transmit the Beacon frame.

On the other hand, the communication apparatus 104 that is the multi-link communication non-supporting apparatus transmits the Probe Request frame by broadcast in the 5 GHz band (M7021). At this time, the communication apparatus 102 can receive the Probe Request frame through the frequency channel in the 5 GHz band. The communication apparatus 102 transmits the Probe Response frame in response to the received Probe Request frame (M7022). As a result, the communication apparatus 104 detects that the communication apparatus 102 can perform communication through the frequency channel in the 5 GHz band.

To establish connection with the communication apparatus 102 in the 5 GHz band, the communication apparatus 104 transmits the Association Request frame (M7023). The communication apparatus 102 transmits the Association Response frame in response to the received Association Request frame (M7024). As a result, the communication apparatus 104 and the communication apparatus 102 establish connection through the frequency channel in the 5 GHz band.

With the connection as a trigger, the communication apparatus 102 determines in step S403 that the use state of the frequency channel has been changed. The processing then returns to step S401. Although the communication apparatus 102 transmits the Beacon frame through the frequency channel in the 2.4 GHz, the communication apparatus 102 switches the frequency channel to transmit the Beacon frame, to the frequency channel in the 5 GHz band, based on that one communication apparatus has established connection in the 5 GHz band.

Because of the switching, it is sufficient for the communication apparatus 104 to monitor the Beacon frame only through the frequency channel in the 5 GHz band through which the connection has been established.

The communication apparatus 102 may transmit the Action frame (M7016) through the frequency channel through which the Beacon frame is being transmitted, in order to notify switching of the frequency channel to transmit the Beacon frame. The communication apparatus 102 maintains transmission of the Beacon frame through the frequency channel to transmit the Beacon frame (M7025). The communication apparatus 103 that has received the Action frame (M7016) can continue the communication with the communication apparatus 102 by switching the monitoring frequency channel of the Beacon frame, from the 2.4 GHz to the 5 GHz band.

In a case where the communication apparatus 103 supports the multi-link communication but has established connection only through the 2.4 GHz band, the communication of the communication apparatus 103 is disconnected because the frequency channel to transmit the Beacon frame is switched from the 2.4 GHz band to the 5 GHz band. However, the communication apparatus 103 also detects that the communication apparatus 102 can establish connection in the 5 GHz band from the frequency channel information on the Beacon frame. Therefore, the communication apparatus 103 can also request connection in the 5 GHz band.

Figure 8:
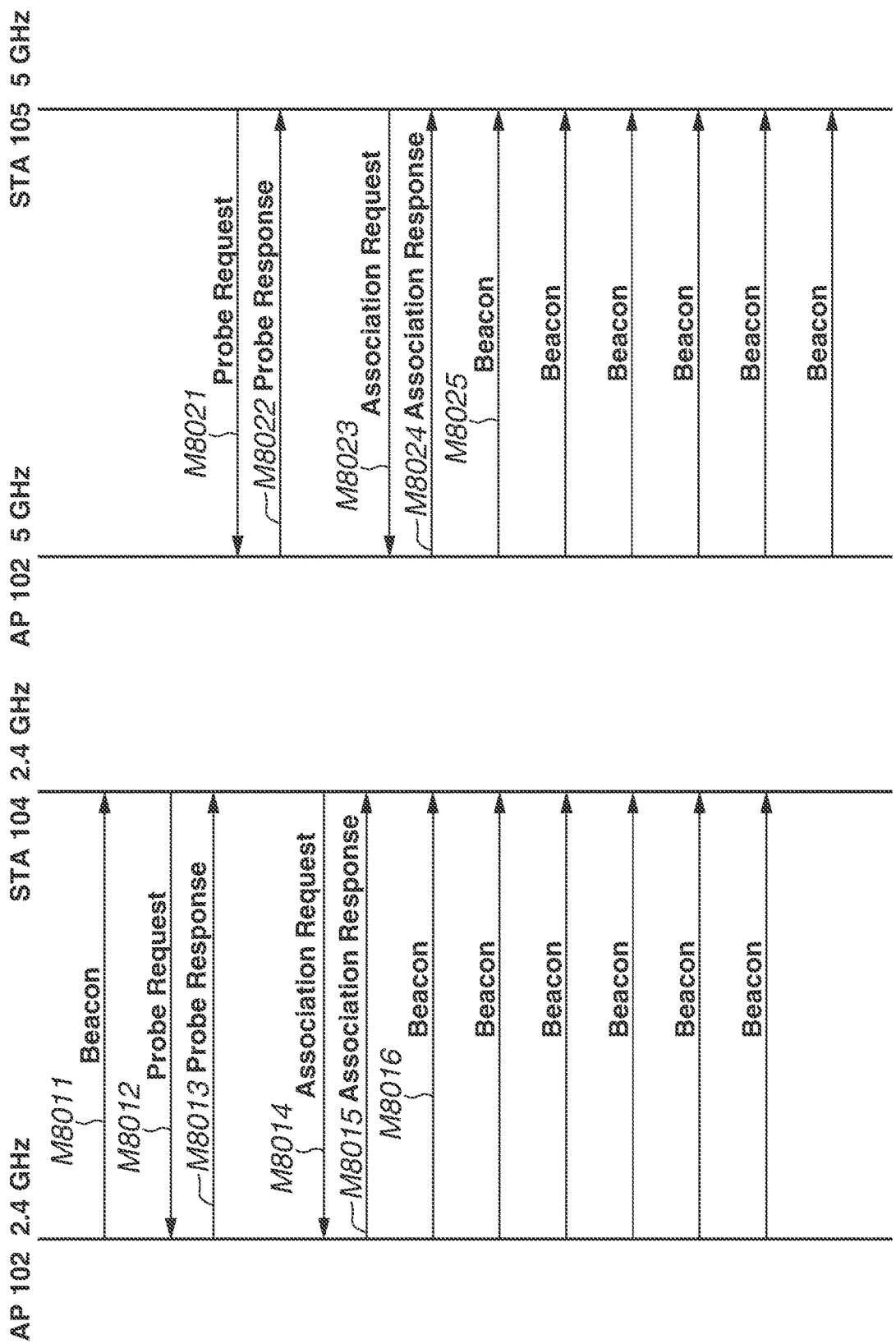
FIG. 8 is a sequence diagram in a case where the communication apparatus 104 that is the multi-link communication non-supporting apparatus establishes connection, and then the communication apparatus 105 that is the multi-link communication non-supporting apparatus establishes connection.

FIG. 8 is a sequence diagram in a case where the communication apparatus 102 and the communication apparatus 104 that is the multi-link communication non-supporting apparatus establish connection, and then the communication apparatus 102 and the communication apparatus 105 that is the multi-link communication non-supporting apparatus establish connection. As an example, a case where, after the communication apparatus 102 determines the frequency channel in the 2.4 GHz band as the frequency channel to transmit the Beacon frame, the communication apparatus 104 establishes connection in the 2.4 GHz band, and then the communication apparatus 105 establishes connection in the 5 GHz band, is described.

In step S502 after startup, the communication apparatus 102 determines the 2.4 GHz band as the frequency channel to transmit the Beacon frame, and in step S402, the communication apparatus 102 starts transmission of the Beacon frame (M8011). The communication apparatus 104 starts reception of the Beacon frame through the frequency channel in the 2.4 GHz band. The Beacon frame includes not only the frequency channel information on the 2.4 GHz band but also the frequency channel information on the 5 GHz band. However, since the communication apparatus 104 is the multi-link communication non-supporting apparatus, the communication apparatus 104 cannot identify that the communication apparatus 102 can perform communication through the frequency channels in the 2.4 GHz band and the 5 GHz band. Under the situation, the communication apparatus 104 transmits the Probe Request frame by broadcast in the 2.4 GHz band (M8012). The communication apparatus 102 can receive the Probe Request frame through the frequency channel in the 2.4 GHz band. The communication apparatus 102 transmits the Probe Response frame in response to the received Probe Request frame (M8013). As a result, the communication apparatus 104 detects that the communication apparatus 102 can perform communication through the frequency channel in the 2.4 GHz band.

To establish connection with the communication apparatus 102 in the 2.4 GHz band, the communication apparatus 104 transmits the Association Request frame (M8014). The communication apparatus 102 transmits the Association Response frame in response to the received Association Request frame (M8015). As a result, the communication apparatus 104 and the communication apparatus 102 establish connection through the frequency channel in the 2.4 GHz band.

With the connection as a trigger, the communication apparatus 102 determines in step S403 that the use state of the frequency channel has been changed. The processing then returns to step S401. Although the communication apparatus 102 detects that the communication apparatus has established connection in the 2.4 GHz band, the communication apparatus 102 determines in step S505 that the Beacon frame is continuously transmittable through the frequency channel in the 2.4 GHz band, and maintains the frequency channel to transmit the Beacon frame.

On the other hand, when the communication apparatus 105 transmits the Probe Request frame by broadcast in the 5 GHz band (M8021), the communication apparatus 102 can receive the Probe Request frame through the frequency channel in the 5 GHz band. The communication apparatus 102 transmits the Probe Response frame in response to the received Probe Request frame (M8022). As a result, the communication apparatus 105 detects that the communication apparatus 102 can perform communication through the frequency channel in the 5 GHz band.

To establish connection with the communication apparatus 102 in the 5 GHz band, the communication apparatus 105 transmits the Association Request frame (M8023). The communication apparatus 102 transmits the Association Response frame in response to the received Association Request frame (M8024). As a result, the communication apparatus 105 and the communication apparatus 102 establish connection through the frequency channel in the 5 GHz band.

With the connection as a trigger, the communication apparatus 102 determines in step S403 that the state of the frequency channel has been changed. The processing then returns to step S401. The communication apparatus 102 detects that connection with the multi-link communication non-supporting apparatus has been established through the frequency channels in the 2.4 GHz band and the 5 GHz band. As a result, in step S510, the communication apparatus 102 switches the frequency channel to transmit the Beacon frame to the frequency channel in the 2.4 GHz band and the frequency channel in the 5 GHz band.

Because of the switching, it is sufficient for the communication apparatuses 104 and 105 to monitor the Beacon frame only through the respective frequency channels through which the connection has been established.

As described above, the communication apparatus 102 according to the present exemplary embodiment can prevent occurrence of the communication apparatus that cannot receive the Beacon frame, by switching the frequency channel to transmit the Beacon frame.

Note that a recording medium storing program codes of software realizing the above-described functions may be supplied to a system or an apparatus, and a computer (CPU or MPU) of the system or the apparatus may read out and execute the program codes stored in the recording medium. In this case, the program codes themselves read out from the storage medium realize the functions of the above-described exemplary embodiment, and the storage medium storing the program codes configures the above-described apparatus.

Examples of the storage medium to supply the program codes include a flexible disk, a hard disk, an optical disk, a magnetooptical disk, a CD-ROM, a CD-R, a magnetic tape, a nonvolatile memory card, a ROM, and a DVD.

Further, the above-described functions may be realized not only by executing the readout program codes by the computer but also by causing an OS operating in the computer to perform a part or all of the actual processing based on instructions of the program codes.

Further, the program codes read out from the storage medium may be written in a memory included in a function expansion board inserted into the computer or a memory included in a function expansion unit connected to the computer. Further, a CPU provided in the function expansion board or the function expansion unit may perform a part or all of the actual processing based on instructions of the program codes, thereby realizing the above-described functions.

The present invention can be realized by supplying programs realizing one or more functions of the above-described exemplary embodiment to a system or an apparatus through a network or a storage medium, and causing one or more processor in a computer of the system or the apparatus to read out and execute the programs. Further, the present invention can be realized by a circuit realizing one or more functions (e.g., ASIC).

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, when communication through the plurality of frequency channels is performed, it is possible to perform communication while preventing occurrence of the communication apparatus that cannot receive the Beacon frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that establishes connection with another communication apparatus through a first frequency channel and a second frequency channel, the communication apparatus comprising:
   a transmission unit configured to transmit a Beacon frame including first frequency channel information and second frequency channel information, the first frequency channel information being information to perform communication through the first frequency channel, the second frequency channel information being information to perform communication through the second frequency channel; and
   a switching unit configured to switch, in a case where the transmission unit transmits the Beacon frame through the first frequency channel, and a second other communication apparatus and the communication apparatus establish connection through the second frequency channel while the communication apparatus and a first other communication apparatus that identifies the first frequency channel information and the second frequency channel information included in the Beacon frame establish connection through the first frequency channel, a frequency channel to transmit the Beacon frame from the first frequency channel to the second frequency channel.

2. The communication apparatus according to claim 1, wherein, in a case where the transmission unit transmits the Beacon frame through the first frequency channel, and the second other communication apparatus and the communication apparatus establish connection through the second frequency channel while the communication apparatus and a third other communication apparatus that does not identify the first frequency channel information and the second frequency channel information included in the Beacon frame establish connection through the first frequency channel, the communication apparatus transmits the Beacon frame through the first frequency channel and the second frequency channel.

3. The communication apparatus according to claim 1, wherein, in a case where the transmission unit transmits the Beacon frame through the first frequency channel, and the second other communication apparatus and the communication apparatus establish connection through the first frequency channel while the first other communication apparatus and the communication apparatus establish connection through the first frequency channel, the switching unit does not switch the frequency channel to transmit the Beacon frame, and transmission of the Beacon frame through the first frequency channel is maintained.

4. The communication apparatus according to claim 1, wherein the first frequency channel information and the second frequency channel information are imparted to the Beacon frame by being stored in a Multi-Link Capability Element or a Multi-Band element.

5. The communication apparatus according to claim 1,
   wherein the information to perform communication through the first frequency channel includes information for the other communication apparatus to take synchronization through the first frequency channel, and
   wherein the information to perform communication through the second frequency channel includes information for the other communication apparatus to take synchronization through the second frequency channel.

6. The communication apparatus according to claim 5, wherein the information to take synchronization is timing synchronization function (TSF).

7. The communication apparatus according to claim 1, wherein the communication apparatus operates as an access point complying with an Institute of Electrical and Electronics Engineers (IEEE) 802.11be standard.

8. A non-transitory storage medium storing a program causing a computer to function as each of the units of the communication apparatus according to claim 1.

9. A method of controlling a communication apparatus that establishes connection with another communication apparatus through a first frequency channel and a second frequency channel, the method comprising:
   transmitting a Beacon frame including first frequency channel information and second frequency channel information, the first frequency channel information being information to perform communication through the first frequency channel, the second frequency channel information being information to perform communication through the second frequency channel; and
   switching, in a case where the Beacon frame is transmitted through the first frequency channel, and a second other communication apparatus and the communication apparatus establish connection through the second frequency channel while the communication apparatus and a first other communication apparatus that identifies the first frequency channel information and the second frequency channel information establish connection through the first frequency channel, a frequency channel to transmit the Beacon frame from the first frequency channel to the second frequency channel.

* * * * *